(12) United States Patent
Farrell, Jr.

(10) Patent No.: US 11,014,006 B1
(45) Date of Patent: May 25, 2021

(54) METHOD AND SYSTEM FOR COMPETITIVE VIDEO GAME PLAYING

(71) Applicant: Timothy James Farrell, Jr., Hanson, MA (US)

(72) Inventor: Timothy James Farrell, Jr., Hanson, MA (US)

( * ) Notice: Subject to any disclaimer, the term of this patent is extended or adjusted under 35 U.S.C. 154(b) by 0 days.

(21) Appl. No.: 16/788,849

(22) Filed: Feb. 12, 2020

(51) Int. Cl.
 *A63F 13/75* (2014.01)
 *A63F 13/46* (2014.01)
 *A63F 13/35* (2014.01)

(52) U.S. Cl.
 CPC .............. *A63F 13/75* (2014.09); *A63F 13/35* (2014.09); *A63F 13/46* (2014.09)

(58) Field of Classification Search
 None
 See application file for complete search history.

(56) References Cited

U.S. PATENT DOCUMENTS

| 10,424,160 | B2 * | 9/2019 | Denham | ............. | G07F 17/3244 |
| 2007/0077994 | A1 * | 4/2007 | Betteridge | .............. | G07F 17/32 |
| | | | | | 463/42 |
| 2013/0331191 | A1 * | 12/2013 | Puryear | ................. | A63F 13/335 |
| | | | | | 463/42 |
| 2016/0203614 | A1 * | 7/2016 | Wang | ................. | G06K 9/00335 |
| | | | | | 382/103 |
| 2019/0192978 | A1 * | 6/2019 | Eatedali | ................ | A63F 13/355 |

* cited by examiner

*Primary Examiner* — Ronald Laneau
(74) *Attorney, Agent, or Firm* — Lanier Ford Shaver & Payne PC; Gerald M. Walsh

(57) ABSTRACT

A method for league, tournament, and competition video game playing implemented through an application from an application provider's server and downloaded onto a game player's smartphone. A player selects on the smartphone to play a game over the internet. The player is placed in a lobby, selects a game, contest, and platform and uses the smartphone for audio/visual communication during game play. Players are matched with players of similar skills based on skill measurements. Eliminated players are returned to the lobby for continuous play. Player identity is validated, and player cheating is detected. The application provides on the player's smart phone accounting, social media, lobby, recent matches and live matches functions. Winners are provided payouts. Eliminated players may have continuous play.

28 Claims, 7 Drawing Sheets

METHOD AND SYSTEM FOR COMPETITIVE VIDEO GAME PLAYING

FIELD OF THE INVENTION

This invention relates to systems and methods for managing computer video game competition and, more particularly, to a system and method for creating and managing professional league, tournament, and competitive video game playing that encompasses video game players at all skill levels.

BACKGROUND OF THE INVENTION

There are hundreds of millions of potential e-sports competitors looking for opportunities to join and play competitive video games. Many of these competitors play competitive video games as a way to make money and more are starting to view it as a viable career choice. Teams of players of select games are being created and sold and these video game players receive salaries plus a percent of what they earn through successful completion of tournaments. However, these players and teams encompass a tiny fraction of the video game playing market and they severely limit who is able to participate in interactive video gaming tournaments. The primary difference between professional sports and video games is the percent of people with sufficient skill necessary to compete on a professional level. With growing interest in virtual games, there is an exponentially larger number of people with the skill to compete in professional, interactive video gaming tournaments compared to the number of people that are qualified to participate in professional sports. However, there is currently no adequate system or method to incentivize, facilitate, and support extensive professional, interactive video gaming leagues and tournaments.

Video games which are accessible to multiple players via a server or peer to peer network are well known. For example, hundreds of millions of players access games known as massive multi-player online games. Players of these games customarily access a game repeatedly over a given period of time. The games are often constructed such that players pay a periodic subscription price or a onetime purchase price for the game. Often, though not necessarily, these games have no defined "winner" or "winning goal," but instead attempt to create an enjoyable playing environment and a strong player community.

In some current embodiments, interactive gaming tournaments with entrance fees and cash prizes based on skill rely on an event organizer to collect and distribute the entrance fees and prize pools by visually witnessing the outcome of matches. These games also allow players to experience a rising sense of excitement by providing them with goals and objectives within the game that give the gaming experience a greater feeling of purpose and meaning.

Video games are in the nascent stages of being recognized as a viable spectator sport. Current video game systems and social media-based methods for the development and distribution of video game content have not been adequate to provide skill-based player growth and monetization for video game players. The video gaming industry lacks the mechanics and the structure to develop professional, interactive video gaming leagues and tournaments. In any successful, long term traditional sport with a broad fan-base, there exist several key qualities. Fans and players are acquired through a structured set of leagues ranging from youth leagues to professional leagues. Skilled athletes have a well-defined path to making income. Game integrity is maintained through a governing body. Marketing athletic events is aimed at player recognition and improvement of player skills. These qualities do not exist in video game industry.

League-based play is critical for creating player popularity and providing a path for players to receive income. A lack of a well-defined path to player income reduces long-term player interest in playing and reduces the interest in fans watching the games. Social media marketed video game players are watched for their personalities and reputations rather than their skills and performance. Currently there is no adequate process to identify skilled players for eSports that encompasses the entire video player population. There is currently no effort to enable video games to operate like traditional professional athletic sports. Although there are 2.5 billion video game players world-wide, there is no effective global communication and interaction among these video game players. There is no financial incentive or satisfactory compensation for the majority of these video game players. There are unfair competitive advantages and lack of adequate security in current professional video game play. What is needed is a system and method for professional league, tournament, and competition video game playing that addresses these problems and deficiencies.

SUMMARY OF THE INVENTION

The present invention provides a method and system for league, tournament, and competition video game playing. A competition video game playing application (application) is downloaded, over a network onto a user's smartphone that is associated with a user, from an application provider's server system. The application provider's server system includes one or more processors and a memory, and a league, tournament, and competition video game playing application (application). The application is initiated on the user's smartphone through a processor in the smart phone. The user logs into and connects to the application provider's server system over the network, using the smartphone. The quality and sufficiency of the user's smartphone connection to the application provider's server system is evaluated by the one or more processors in the application provider's server. The application provider's server system displays on the smart phone the video game options and contests for playing video games over the network. The video game options are based on the user's account status, network quality and sufficiency, and game availability.

A video game baseline score or baseline progress measurement for each user for one or more games in one or more video game genres is obtained in order to match all users evenly and fairly in a video game and match. The smartphone is paired with one or more video game playing devices and is used for audio and visual communication during video game playing.

The user is entered into a lobby as a video game player through the application provider's server system A video game and contest are selected and the video game player enters into a video game in a video game set in a plurality of video game sets, wherein each video game set in the plurality of video game sets has a payout different from the other video game sets. The video game player begins playing the video game by on one or more video game playing devices, over the network and through the application provider's server system.

The video game player's scoring and progress is monitored and recorded over the network during video game playing and the identity of the video game player is verified in the processor in the application provider's server system. The video game player's game playing is invalidated if the video game player's identity is not verified. Cheating by a video game player in a video game is detected by comparing baseline scores or baseline progress measurements of the video game player with scoring or progress of the video game player in the video game. The video game ends and winnings are distributed to winners of the video game.

A video game player eliminated from a video game is returned, preferably automatically, into the lobby and is entered into another video game which can be in a different video game set and the different game set may have a higher payout than the video game set from which the video game player was eliminated.

When not playing a video game a user can use using icons on a display of the smartphone to access an account function, a social media network function, a lobby function, a recent matches function, and a live matches function, through the network and the application provider's server system.

A system for implementing league, tournament, and competition video game playing includes an application provider's server system that includes one or more processors, a memory, and a league, tournament, and competition video game playing application in the memory. The one or more processors are programmed to receive a request from a user's smartphone to download the application over a network to the user's smart phone, into a memory of the user's smart phone. The memory of the user's smartphone includes instructions that when executed cause one or more processors in the user's smart phone to initiate the application on the user's smartphone and connects the user to the application provider's server over the network, whereby the application provider's server, through the application implements the method of this invention.

An advantage of the present invention is a method and system that provides social media-based methods for the development and distribution of video game content to provide skill-based video game player growth and monetization for video game players.

Another advantage is video game integrity being maintained through a governing body.

Another advantage is a method and system that can market video gaming events aimed at player recognition and improvement of player skills.

Another advantage is method and system that provides a well-defined path to video game player income.

Another advantage is process to identify skilled players for eSports that encompasses the entire video game player population.

Another advantage is a method and system that provides effective global communication and interaction among video game players.

Another advantage is a method and system that eliminates unfair competitive advantages and provides adequate security in professional video game play.

DETAILED DESCRIPTION OF THE INVENTION

While the following description details the preferred embodiments of the present invention, it is to be understood that the invention is not limited in its application to the details of arrangement of the parts or steps of the methods illustrated in the accompanying figures, since the invention is capable of other embodiments and of being practiced in various ways.

Figure 1:
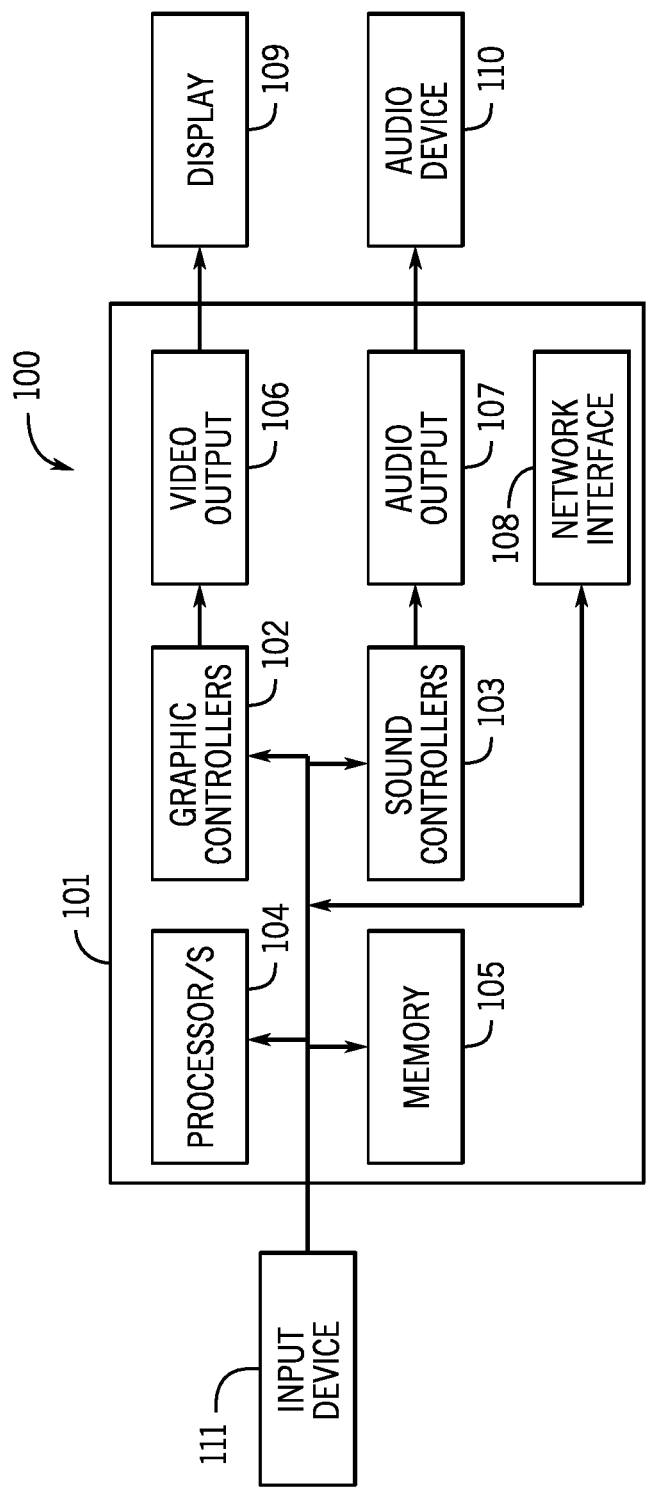
FIG. 1 provides a schematic block diagram of a user computer system for implementing this invention.
Figure 2:
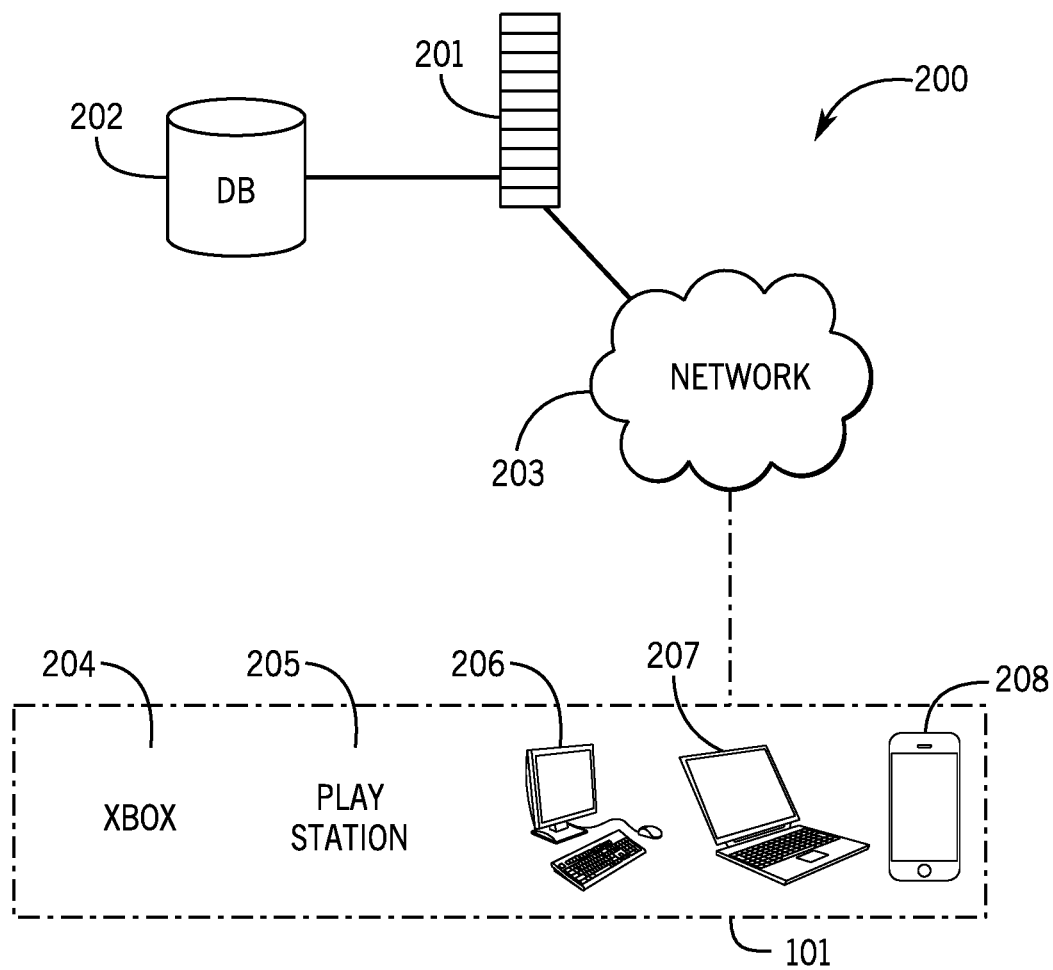
FIG. 2 shows block diagram of an application provider's network server system for implementing this invention for competitive video game playing.

Some of the factors that motivate video game players to play video games include winning, financial gain, being fairly challenged by another player, and improving video game playing skills. This invention provides a system, method, and computer program product for professional league, tournament, and competition video game playing that provide these motivations to video game players and provide video game players at all skill levels the opportunity to play professionally. This invention can be implemented in a computer system and network system as shown in FIGS. 1 and 2 as non-transitory computer-readable media which comprise all computer-readable media except for a transitory, propagating signal. FIG. 1 provides a schematic block diagram of a user system 100 for implementing this invention. All of the blocks shown are implemented by suitable circuitry and may be implemented in hardware and/or software. The user system 100 has a computer system 101 having a graphics controller 102 and a sound controller 103. The graphics controller 102 and sound controller 103 are provided by the one or more processors 104 and memory 105. The graphics controller 102 is configured to provide a video output 106. The sound controller 103 is configured to provide an audio output 106. The computer system 101 has a network interface 108 allowing the computer system 101 to be able to communicate with a network such as the Internet or other communication infrastructure. The video output 106 is provided to a display 109. The audio output 107 is provided to an audio device 110 such as a speaker and/or earphone. The user device 100 has an input device 111 which can take any suitable format and can be one or more keyboards, audio input, mouse, touch screen, joystick or game controller. The user device 100 is shown by way of example only. In alternative embodiments, one or more of the parts may be omitted. Alternatively, or additionally, some embodiments may comprise one or more other parts. Alternatively, or additionally, one or more parts may be combined.

FIG. 2 shows block diagram of an application provider's network server system 200 for implementing this invention comprising a server 201 which may provide storage or be in communication with database 202. The server 201 may have all the features shown in FIG. 1, including computer games, learning programs, data storage and comprise one or more units of memory to store computer game programs and applications, and one or more processors to run game related programs, applications, and learning programs. The server 201 may communicate via a communications infrastructure 203 to one or more user computer systems 101, shown as Xbox 204, play station 205, computer 206, tablet 207 and smart phone 208. The communications infrastructure 203 may be the Internet or the like.

Figure 3:
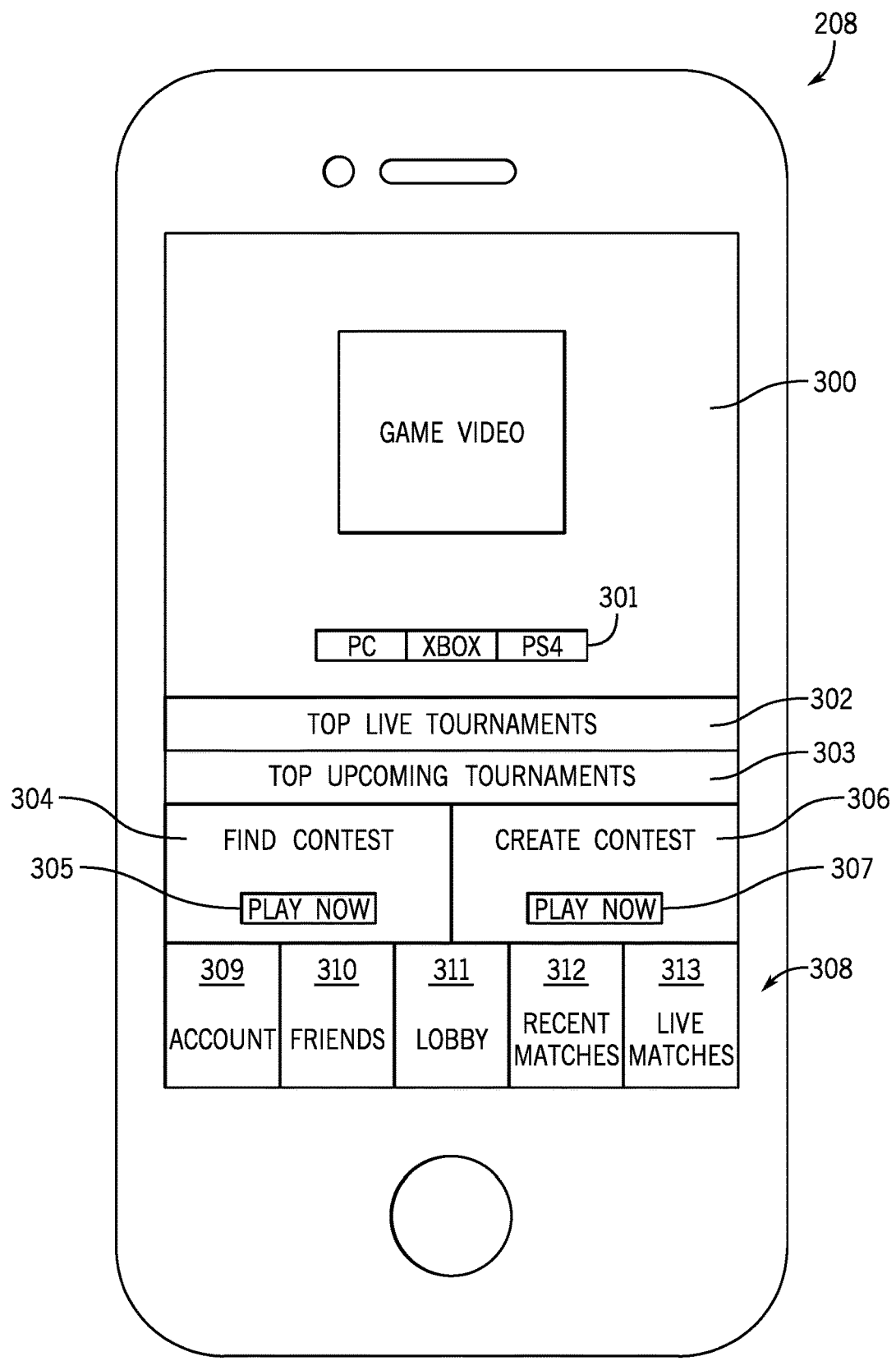
FIG. 3 shows an example of a smart phone with a standard home page and lobby menu on the display screen, generated by the application provider's application for competitive video game playing.

FIG. 3 shows an example of a smart phone 208 with a standard home page and lobby menu on the display screen 300. The present invention uses a smart phone 208 for communicating with an application provider's server 201 in the network server system 200 for league, tournament, and competition video game playing. A smartphone is a hand-held personal computer having features like those shown in FIG. 1. A smartphone possesses extensive computing capabilities, including high-speed access to the Internet using both Wi-Fi and mobile broadband. Most, if not all, smart-phones are also built with support for Bluetooth wireless transmission and satellite navigation (GPS). Modern smart-phones have a touchscreen color display 300 with a graphical user interface that covers the front surface and enables a user to use a virtual keyboard to type and press onscreen icons. Interaction is mostly done using touch, besides a few physical buttons.

Smartphones function using a rechargeable lithium-ion or lithium-polymer battery. Smartphones use a mobile operating system and can process a variety of software components, known as applications or "apps". Most basic apps (e.g. event calendar, camera, web browser) come pre-installed with the system, while others are available for download. Apps, and the operating system in the smart-phone, can receive additional functionality through updates.

The smartphone 208 is used by the user to download a league, tournament, and competition video game playing application (the application) from the application provider's network server system 200. A login display is shown on the smart phone 208 after downloading the application. After logging in to the application provider's network server system 200 the standard home page and lobby menu is shown on the smartphone 208, as shown in FIG. 3. The smart phone 208 can be paired with game playing devices (platforms) 204, 205, 206, and 207 and serve as a remote controller for the application provider's network server system 200 and for the devices. Access button 301 is used for selecting the platforms, access button 302 is used for selecting live video game tournaments 302, and access button 302 is used for selecting upcoming video game tournaments 303 through the downloaded application. A user (game player) can select and find a video game contest 304 and play 305 or select creating a video game contest 306 and play 307. At the bottom end of the smartphone 300 there may be a display of access tabs or icons 308 for accessing various functions such as, for example, accounting 309, friends (social media networks), 310, lobby 311, recent matches 312, and live matches 313.

The top live tournaments 302 option shows major tournaments and events for the day, allowing the user to watch the gamer of their choice or a friend playing a video game in a match. The top live tournaments 302 option also gives users the chance to scout and recruit other video game players to join their teams or squads in other events and tournaments. Similarly, upcoming video game tournaments 303 can be reviewed for registration.

In order to participate in a video game, the user choses a platform and a video game on the user's smartphone. The smartphone itself can be used as a platform. Each video game will have unique contests and tournaments. For Example, a shooter would not have the same contest and events as a sports video game because each video game is formatted differently. After selecting a video game and contest 304 the user selects the play now option 305. Selecting this option shows the user's friends that the user is ready to play cooperatively in a contest as well as showing with whom the user has recently interacted. This option gives the user and his or her friends a chance to join a contest of their choice together. After the video game is played, depending on where the user places in the video game contest, the user is compensated for the user's participation in the video game contest and receives earnings or winnings (payout) into the user's account. After the user receives his or her payout or if the user lost his or her event, the user remains able to play any match of his or her choosing, depending on how much money is in the user's account.

Using the Account tab 309 the user has access to his or her avatar and profile and can add or withdraw money, obtain financial transaction history, refer friends, access rewards, and adjust his or her notification settings. The user can get an adjusted balance on his or her profits or money total as well as access points and vouchers received for entering tournaments.

Using the Friends tab 310 a social media function is provided to the user. The user will be able to connect, chat, live stream, and share with friends, including live streaming.

Using the Lobby tab 311 provides the user an easy access to enter a game. The user selects a desired platform, selects a desired game, and then selects a desired game structure or contest.

Using the Recent Matches tab 312 shows the user the recent matches in which the user has participated as well as what platform the user used. The user can watch a video of any match in which the user participated. This feature provides the user the ability to view their performance on video, to edit the video, and to share the video with friends through the social media Friends 310 function.

Using the Live Matches tab 313 allows the user to view and stream the major video game events for the current day. Each day may have a major daily tournament or event for each game and platform. Providing viewing of daily video games to video game players is expected to give them confidence to participate in video game competition. There are many video game players who have not participates\d in video game competition because of a lack of confidence in their video game playing abilities. Watching other video game players and friends participate in the video game competition is expected to improve their video game playing ability and give them the confidence to compete in competitive, challenging, professional video game matches and tournaments.

Figure 4:
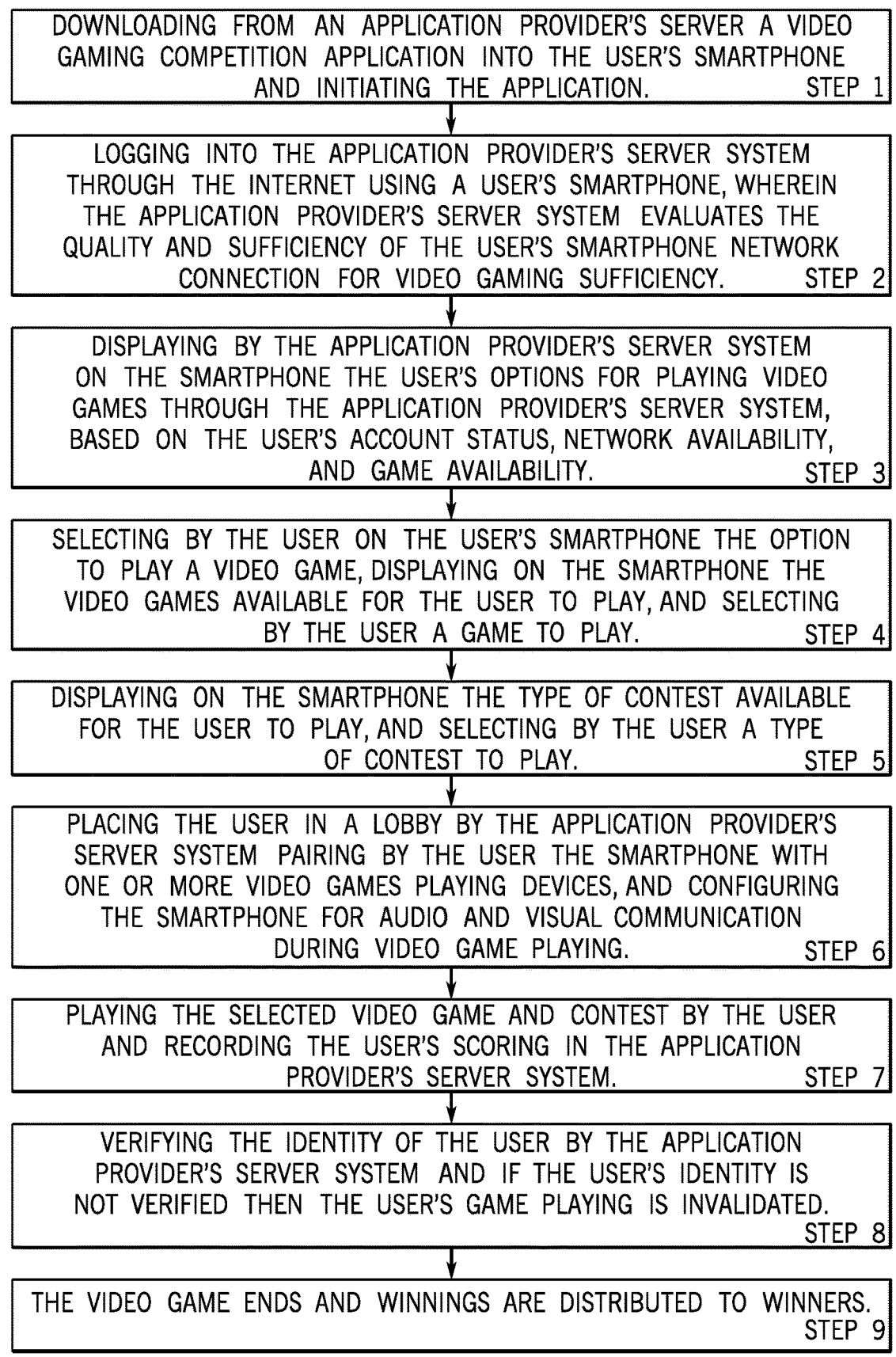
FIG. 4 is a flow diagram of the method for professional league, tournament, and competition video game playing of this invention.

FIG. 4 is a flow diagram of the method for professional league, tournament, and competition video game playing of this invention. A user initiates a video gaming competition application on the user's smart phone which the user downloaded from an application provider's server onto the user's smartphone (Step 1). The user logs into the application provider's server system through the internet and the quality and sufficiency of the user's network connection to the application provider's server is evaluated for video gaming sufficiency (Step 2). The user's options for playing video games through the application provider's server, based on the user's account status, network availability, and game availability are displayed to the user (Step 3).

Video game players that utilize an online gaming platform can gain status among a gaming community. Video game players that achieve specific goals in a video game may be awarded items that can be used by the player in that game, in other games, and/or in other services offered by the platform. These items may inform other players of that player's accomplishments on the platform. The achievement of such goals, in combination with high scores in games played on the platform, amount of time spent playing games on the platform, etc, may contribute toward a ranking of the player relative to other players on the platform. Such achievements and rankings can motivate players on the platform to continue to use the platform and improve game play over time. The probability of achieving these goals is achieved if the video game players are evenly and fairly matched.

Video game players can be properly matched if their game playing skills have been measured and quantitated. Video game skills have been measured using machine learning methods. The relationship between video game genres and video game skills has been described (Santos et al, "Relationship between video game genres and soft skills; https://gecon.es/game-genres-and-soft-skills/; 2018, incorporated herein by reference). The video game skills are of four types: cognitive and physical, basic, cross-functional and emotional. Cognitive and physical include the following skills: cognitive flexibility, creativity, logical reasoning, induction, speed of reasoning, problem sensitivity, visualization, spatial relations, and spatial scanning. Basic skills include communication, and monitoring self and monitoring others. Cross-functional skills include complex problem solving; people and team management; time management, judgement and decision making, and coordinating with others. Emotional skills include stress management, frustration tolerance, self-discipline, self-motivation, organizational skills, self-confidence, and goal setting. Video games are generally classified in the following video game genres: adventure, racing, platform, puzzle, racing, role playing, simulation, sports, strategy, and survival. In this invention a video game player's game playing skill may be adequately estimated for any specific video game genre by obtaining the player's score or average score from playing one or more video games in the specific video game genre (baseline score). An estimate of a video game player's overall video game playing skill baseline score can also be estimated from an average of scores obtained from a plurality of video games from a plurality of video game genres. A video game player's game playing skill can also be estimated using a machine learning program, such as, for example, described by LIU et al, U.S. Patent No. 2018/0182208, incorporated herein by reference. Liu et al measure a user's progress in a game which reflects the user's video game playing skills and can provide a video game playing progress baseline score. If a user, using the smartphone 208 selects play 307 for the first time, the user can be requested to select a video game in a specific genre and to play the video game in a match to obtain an estimate or measure of the video game player's game playing skills. The user can repeat this process as desired to obtain an overall measure of game playing skills in a plurality of video game genres.

When the user selects the option to play a video game the video games available for play are presented to the User and the user picks a video game (Step 4). The user's options for type of contest are presented to the user, such as solo match, duo match, or squad match and the user selects a contest (Step 5). A user can be an individual, a duo, or a squad. The user is placed in a lobby, pairs the smartphone with one or more video game playing devices which include personal computers, Xboxes, PlayStations, iPads, or televisions, and uses the smartphone for audio and visual communication during video game playing (Step 6). The smartphone 208 may also be used as a video game playing device. The user plays the selected video game and contest, scoring is monitored and recorded application provider's server, and the player's score is compared to his respective video game baseline score. (Step 7). User identification is further verified based on the results of machine learning monitoring. If the user's progress in a game is classified as abnormal based on machine learning monitoring, as described by LIU et al, then the User's game playing results may be invalidated (Step 8). The video game ends and winnings are distributed to winners (Step 9). For example, in a Royale Solo game with 100 players, with each player paying $1.00 to enter the video game, the following payout is made: first place $30.00, second place $17.50, third place $10.00, 4th place $5.00, 5th and 6th place $3.75, 7th-10th place $2.50, 11th-16th place $2.00, and 17th-20th place $1.50. The remaining $2.00 is paid as profit to the host of the video game contest. Players below 20th place may be automatically looped back to the lobby to play another game, as described below.

Video game playing skills can range from poor to average, to good, and to exceptional. These game skills can be measured as described above and can be used to place video game players into video game leagues, tournaments, and games that evenly match their skills with those of opposing players to ensure fair competition. Video games with a level of difficulty comparable to the skill level of the video game players can be also be provided. When video game players are evenly matched in this way, and the video games are evenly and fairly matched to the player skills, the satisfaction and pleasure of the players video game playing are maximized, and they are motivated to continue their video game playing. Based on a video game player's measurement of skills, video games can be selected to train and coach the player to improve his or her video game skills.

Figure 5:
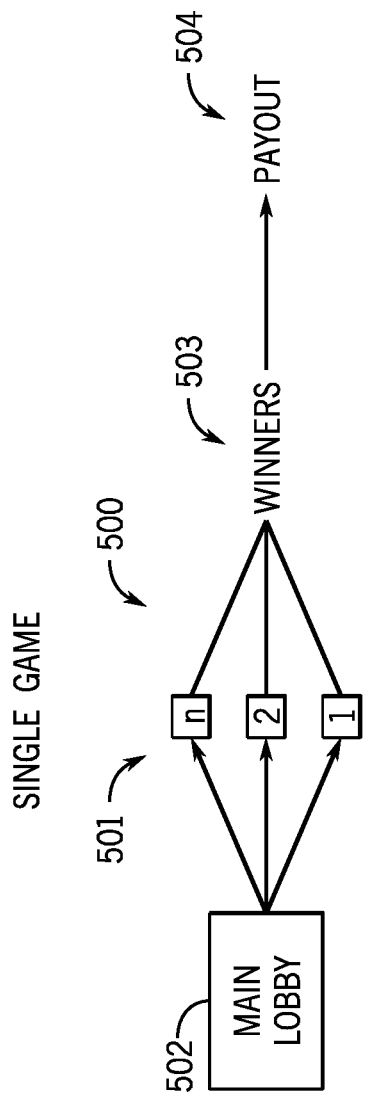
FIG. 5 shows a flow chart of a single video game play design with a plurality of game sets, 1 through n game sets, each game set having two or more identical games.

Various types of video games known in the art are provided to the video game player, for example, Dota, Starcraft, Counterstrike, Warcraft, Crossfire, FIFI, Fortnite, and the like. It is also important to provide video game players with a variety of video game styles to maintain video game player interest and enthusiasm. FIGS. 5-10 show various flows of game play of varying degrees of complexity. FIG. 5 shows a flow chart of a single video game play design 500 with a plurality of game sets 501, 1 through n game sets, each game set having two or more identical games. The sets are different from each other in that the payout incentives for playing are different for each game set. The payout incentives are greater in each set in an ascending order from 1 through n. After a video game player has downloaded the video gaming competition application, from the application provider's server, onto the user's smartphone, a main lobby 502 appears on the display of the smartphone providing a choice of video games for play.

When the user selects a video game and contest, the video game is displayed on the user's video game playing device and the user is assigned by the video gaming competition application, preferably randomly, to one of the game sets. The user's smart phone then automatically functions as an audio-visual device so that the user can communicate with others during game play, for example, with the video game player against whom the user is playing, i.e., another user also selected from the same game set as the user's game set. There may be many users in each game set and many video games in each game set. At the end of each video game the winners 503 are identified and receive a payout 504.

Figure 6:
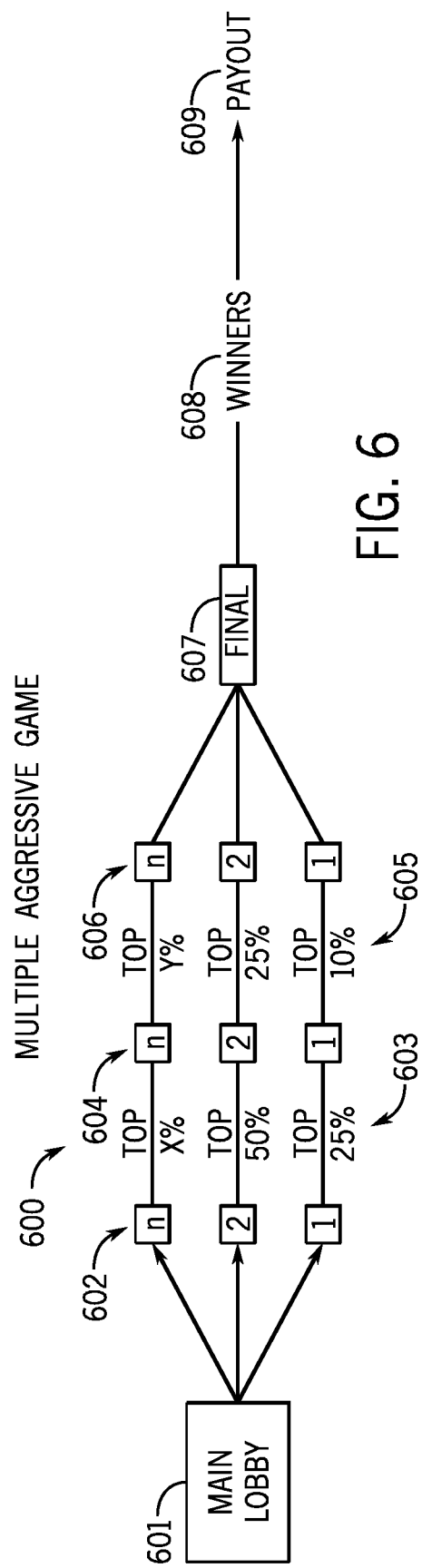
FIG. 6 shows a flow chart of multiple aggressive video game play.

FIG. 6 shows a flow chart of multiple aggressive video game play 600. The user selects a game from a main lobby 601, enters into one of 1 through n game sets 602, and initiates video game play with an opposing video game player on the user's video game playing device. A percentage 603 of top scoring video game players advance into another 1 through n game sets 604 and play a new game. The remaining players are eliminated from play. A percentage 605 of top scoring video game players advance into another 1 through n game sets 606 and play a new game. The winners in each set 1 through n will play a final game 607. Winners 608 in the final game 607 will receive a payout 609. In this video game design video game players have a chance to compete in multiple games. Although only three game sets 602, 604, and 606 are shown, as many games sets as desired may be used.

Figure 7:
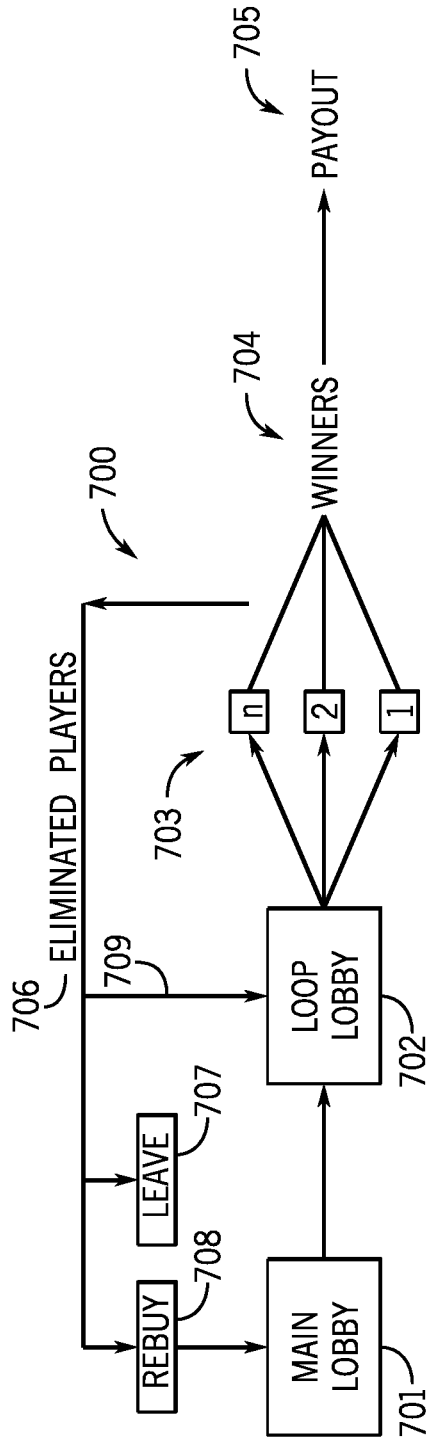
FIG. 7 shows a flow chart of a continuous multiple video game play based on the single video game design of FIG. 5.

FIG. 7 shows a flow chart of a continuous multiple video game play 700 based on the single video game design of FIG. 5. The user selects a game from a main lobby 701 and is presented with a loop lobby 702 wherein the user will be placed into one set of video games in 1 through n game sets 703. Winners 704 in each game set will receive a payout 705. Eliminated players 706 will be able to choose leaving game play 707, rebuying 708 and entering the main lobby 701, or being looped back 709 to the loop lobby 702 to be automatically entered into the same game set, into which the player was first placed, to play another video game. Eliminated players 706 can cycle or loop through the loop lobby 702 continuously or until video game play is ended by the video gaming competition application.

Figure 8:
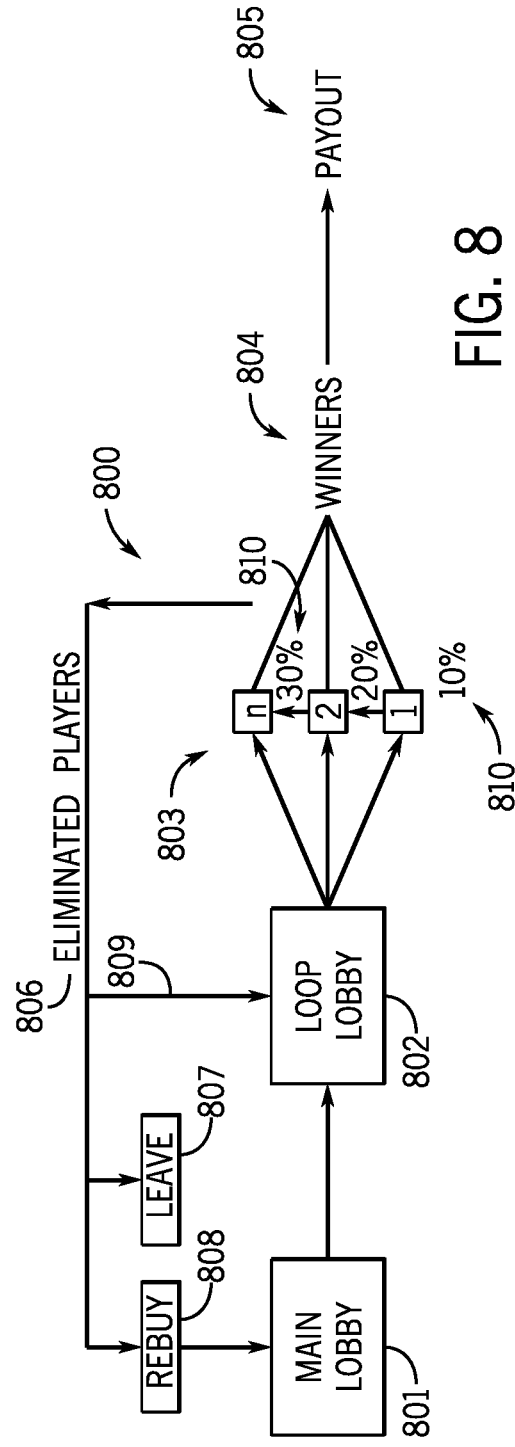
FIG. 8 shows a flow chart of a continuous multiple progressive video game play based on the continuous game design of FIG. 7.

FIG. 8 shows a flow chart of a continuous multiple progressive video game play 800 based on the continuous game design of FIG. 7. The user selects a game from a main lobby 801 and is presented with a loop lobby 802 wherein the user will be placed into one game set of video games in 1 through n game sets 803. Winners 804 in each game set will receive a payout 805. Eliminated players 806 will be able to choose leaving game play 807, rebuying 808 and entering the main lobby 801, or being looped back 809 to the loop lobby 802 to be automatically entered into the same game set, into which the player was first placed, to play another video game. However, a percentage 810 of the eliminated players in each game set will be placed in a next higher game set (greater payout incentive), based on the player's video game performance in the player's previous game. Eliminated players 806 can cycle or loop through the loop lobby 802 continuously or until video game play is ended by the video gaming competition application.

Figure 9:
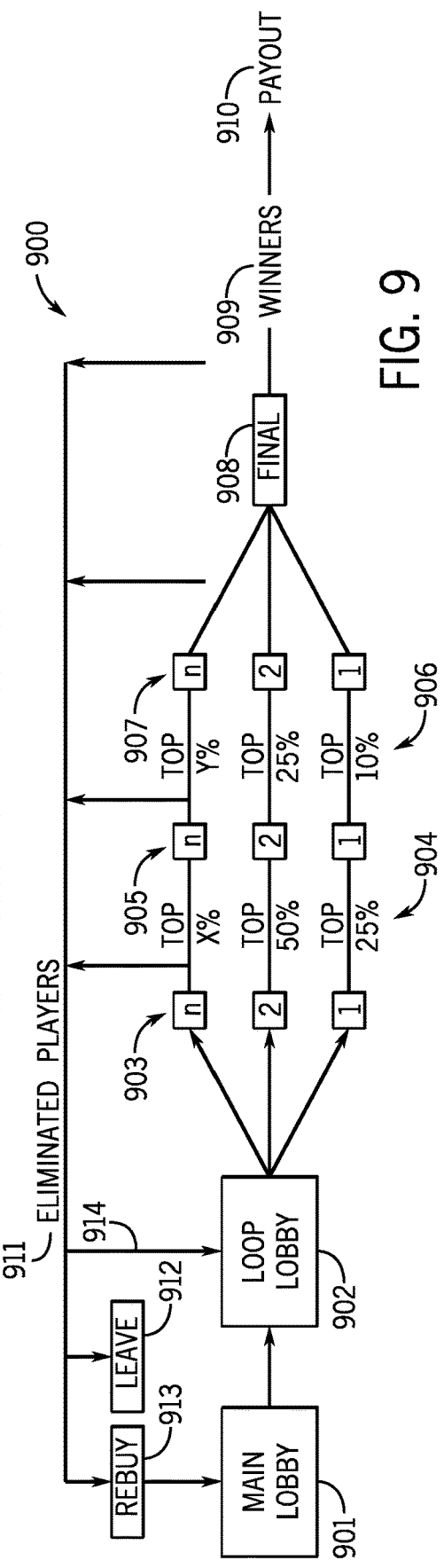
FIG. 9 shows a flow chart of a continuous multiple aggressive video game play based on the multiple aggressive game design of FIG. 6.

FIG. 9 shows a flow chart of a continuous multiple aggressive video game play 900 based on the multiple aggressive game design of FIG. 6. The user selects a game from a main lobby 901 and is presented with a loop lobby 902 wherein the user will be placed into one game set of video games in 1 through n game sets 903. The user initiates play with an opposing video game player on the user's game playing device. A percentage 904 of top scoring video game players advance into another 1 through n game sets 905 and play a new game. The remaining players are eliminated from play. A percentage 906 of top scoring video game players advance into another 1 through n game sets 907 and play a new game. The winners in each set 1 through n will play a final game 908. Winners 909 in the final game 908 will receive a payout 910. Eliminated players 911 will be able to choose leaving game play 912, rebuying 913, and entering the main lobby 901, or being looped back 914 to the loop lobby 902 to be automatically entered into the same game set, into which the player was first placed, to play another video game. Eliminated players 911 can cycle or loop through the loop lobby 902 continuously or until video game play is ended by the video gaming competition application.

Figure 10:
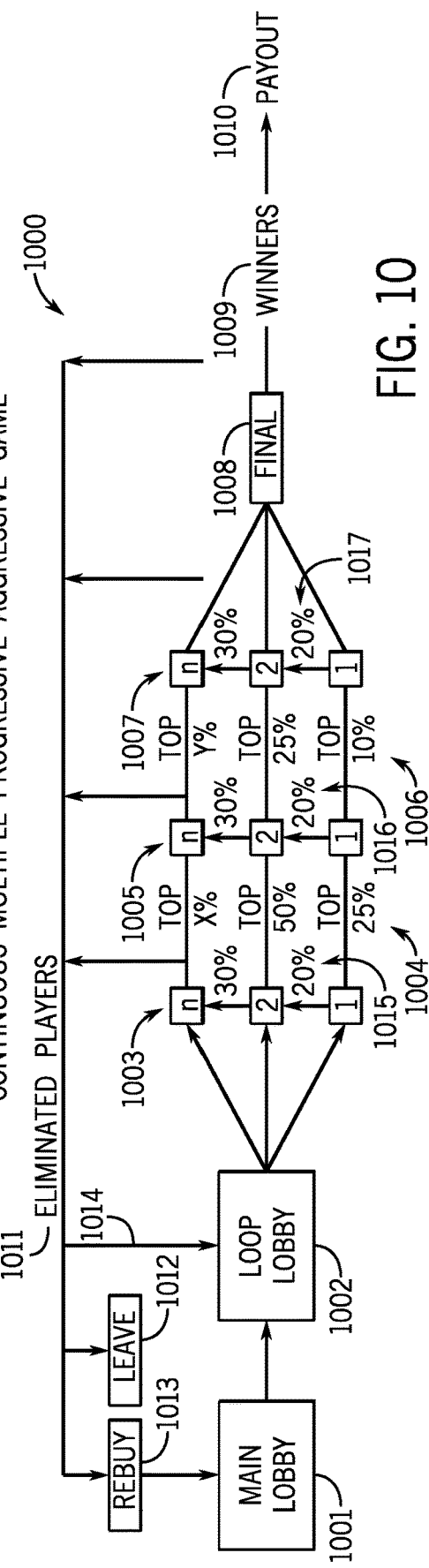
FIG. 10 shows a flow chart of a continuous multiple progressive aggressive video game play based on the continuous multiple progressive video game design of FIG. 8 and the continuous multiple aggressive video game design of FIG. 9.

FIG. 10 shows a flow chart of a continuous multiple progressive aggressive video game play 1000 based on the continuous multiple progressive video game design of FIG. 8 and the continuous multiple aggressive video game design of FIG. 9. The user selects a game from a main lobby 1001 and is presented with a loop lobby 1002 wherein the user will be placed into one game set of video games in 1 through n game sets 1003. The user initiates play with an opposing video game player on the user's game playing device. A percentage 1004 of top scoring video game players advance into another 1 through n game sets 1005 and play a new game. The remaining players are eliminated from play. A percentage 1006 of top scoring video game players advance into another 1 through n game sets 1007 and play a new game. The winners in each set 1 through n will play a final game 1008. Winners 1009 in the final game 1008 will receive a payout 1010. Eliminated players 1011 will be able to choose leaving game play 1012, rebuying 1013 and entering the main lobby 1001, or being looped back 1014 to the loop lobby 1002 to be automatically entered into the same game set, into which the player was first placed, to play another video game. However, a percentage 1015, 1016 1017 of the eliminated players in each game set will be placed in a next higher game set (greater payout incentive), based on the player's video game performance in the player's previous game. Eliminated players 1011 can cycle or loop through the loop lobby 1002 continuously or until video game play is ended by the video gaming competition application.

The foregoing description illustrates and describes the disclosure. Additionally, the disclosure shows and describes only the preferred embodiments but, as mentioned above, it is to be understood that the preferred embodiments are capable of being formed in various other combinations, modifications, and environments and are capable of changes or modifications within the scope of the invention concepts as expressed herein, commensurate with the above teachings and/or the skill or knowledge of the relevant art. The embodiments described herein above are further intended to explain the best modes known by applicant and to enable others skilled in the art to utilize the disclosure in such, or other, embodiments and with the various modifications required by the particular applications or uses thereof. Accordingly, the description is not intended to limit the invention to the form disclosed herein. Also, it is intended that the appended claims be construed to include alternative embodiments. It will be further understood that various changes in the details, materials, and arrangements of the parts which have been described and illustrated above in order to explain the nature of this invention may be made by those skilled in the art without departing from the principle and scope of the invention as recited in the following claims.

The invention claimed is:

1. A method for league, tournament, and competition video game playing, comprising:
   1) downloading, over a network onto a user's smartphone that is associated with a user, from an application provider's server system that includes one or more processors, a memory, and a league, tournament, and competition video game playing application (application);
   2) initiating said application on the user's smartphone by a processor in the user's smart phone, logging into and connecting to the application provider's server system over the network using the user's smartphone, and evaluating, by the one or more processors in the application provider's server, the quality and sufficiency of a connection of the user's smartphone to the application provider's server system;
   3) displaying on the user's smart phone video game options and contests for playing video games over the network through the application provider's server system, wherein the video game options are based on an account status of the user, network quality and sufficiency, and game availability;
   4) placing the user in a lobby as a video game player through the application provider's server system, selecting a video game and contest and playing the video game by the video game player on one or more video game playing devices over the network and through the application provider's server system;
   5) monitoring and recording over the network video game scoring and progress of the video game player during video game playing, by the processor in the application provider's server system;
   6) verifying an identity of the video game player through the application provider's server system and invalidating the video game player's game playing if the video game player's identity is not verified; and
   7) ending the video game and distributing winnings to winners of the video game.

2. The method of claim 1, further comprising obtaining a video game baseline score or baseline progress measurement for each user for one or more games in one or more video game genres to match all users evenly in a video game and match.

3. The method of claim 1, further comprising returning a video game player eliminated from a video game into the lobby and entering the video game player into another video game.

4. The method of claim 1, further comprising detecting cheating by the video game player in a video game by comparing baseline scores or baseline progress measurements of the video game player with scoring or progress of the video game player in the video game.

5. The method of claim 1, further comprising using icons by the user on a display of the user's smartphone to access an account function, a social media network function, a lobby function, a recent matches function, and a live matches function, through the network and the application provider's server system.

6. The method of claim 1, further comprising entering the video game player into a video game in a video game set in a plurality of video game sets, wherein each video game set in the plurality of video game sets has a payout different from the other video game sets.

7. The method of claim 6, further comprising returning a video game player eliminated from a video game into the lobby and entering the eliminated video game player into another video game in a different video game set, the different game set having a higher payout than the video game set from which the video game player was eliminated.

8. The method of claim 1, further comprising pairing the user's smartphone with one or more video game playing devices and using the user's smartphone for audio and visual communication during video game playing.

9. A method for league, tournament, and competition video game playing, comprising:
   1) downloading, over a network onto a user's smartphone that is associated with a user, from an application provider's server system that includes one or more processors, a memory, and a league, tournament, and competition video game playing application (application);
   2) initiating said application on the user's smartphone by a processor in the user's smart phone, logging into and connecting to the application provider's server system over the network using the user's smartphone, and evaluating, by the one or more processors in the application provider server, the quality and sufficiency of a connection of the user's smartphone to the application provider's server system;
   3) displaying on the user's smart phone video game options and contests for playing video games over the network through the application provider's server system, wherein the video game options are based on an account status of the user, network quality and sufficiency, and game availability;
   4) obtaining a video game baseline score or baseline progress measurement for each user for one or more games in one or more video game genres to match all users evenly in a video game and match;
   5) placing the user in a lobby as a video game player through the application provider's server system, selecting a video game and contest and playing the video game by the video game player on one or more video game playing devices over the network and through the application provider's server system;
   6) monitoring and recording over the network video game scoring and progress of the video game player during video game playing, by the processor in the application provider's server system;
   7) verifying an identity of the video game player through the application provider's server system and invalidating the video game player's game playing if the user's identity is not verified;
   8) detecting cheating by the video game player in a video game by comparing baseline scores or baseline progress measurements of the video game player with scoring or progress of the video game player in the video game;
   9) ending the video game and distributing winnings to winners of the video game; and
   10) using icons by the user on a display of the user's smartphone to access an account function, a social media network function, a lobby function, a recent matches function, and a live matches function, through the network and the application provider's server system.

10. The method of claim 9, further comprising returning a video game player eliminated from a video game into the lobby and entering the eliminated video game player into another video game.

11. The method of claim 9, further comprising entering the video eliminated game player into a video game in a video game set in a plurality of video game sets, wherein each video game set in the plurality of video game sets has a payout different from the other video game sets.

12. The method of claim 11, further comprising returning the eliminated video game player into the lobby and entering the video game player into another video game in a different video game set, the different game set having a higher payout than the video game set from which the video game player was eliminated.

13. The method of claim 9, further comprising pairing the user's smartphone with one or more video game playing devices and using the user's smartphone for audio and visual communication during video game playing.

14. A method for league, tournament, and competition video game playing, comprising:
  1) downloading, over a network onto a user's smartphone that is associated with a user, from an application provider's server system that includes one or more processors, a memory, and a league, tournament, a competition video game playing application (application);
  2) initiating said application on the user's smartphone by a processor in the user's smart phone, logging into and connecting to the application provider's server system over the network using the user's smartphone, and evaluating, by the one or more processors in the application provider server, the quality and sufficiency of a connection of the user's smartphone to the application provider's server system;
  3) displaying on the user's smart phone video game options and contests for playing video games over the network through the application provider's server system, wherein the video game options are based on an account status of the user, network quality and sufficiency, and game availability;
  4) obtaining a video game baseline score or baseline progress measurement for each user for one or more games in one or more video game genres to match all users evenly in a video game and match;
  5) pairing the user's smartphone with one or more video game playing devices and using the user's smartphone for audio and visual communication during video game playing;
  6) placing the user in a lobby as a video game player through the application provider's server system, selecting a video game and contest, entering the video game player into a video game in a video game set in a plurality of video game sets, wherein each video game set in the plurality of video game sets has a payout different from the other video game sets and playing the video game by the video game player on one or more video game playing devices over the network and through the application provider's server system;
  7) monitoring and recording over the network video game a scoring and progress of the video game player during video game playing, by the processor in the application provider's server system;
  8) verifying an identity of the video game player through the application provider's server system and invalidating the video game player's game playing if the video game player's identity is not verified;
  9) detecting cheating by a video game player in a video game by comparing baseline scores or baseline progress measurements of the video game player with scoring or progress of the video game player in the video game;
  10) returning a video game player eliminated from a video game into the lobby and entering the video game player into another video game in a different video game set, the different game set having a higher payout than the video game set from which the video game player was eliminated;
  11) ending the video game and distributing winnings to winners of the video game; and
  12) using icons by the user on a display of the user's smartphone to access an account function, a social media network function, a lobby function, a recent matches function, and a live matches function, through the network and the application provider's server system.

15. A system for league, tournament, and competition video game playing, comprising:
  a) an application provider's server system that includes one or more processors, a memory, and a league, tournament, and competition video game playing application (application) in the memory; and
  b) said one or more processors programmed to receive a request from a user's smartphone to download over a network to the user's smart phone the application into a memory of the user's smart phone, said memory of the user's smartphone including instructions that when executed cause one or more processors in the user's smart phone to initiate the application on the user's smartphone and connect the user to the application provider's server over the network, whereby the application provider's server, through the application:
    1) evaluates, by the one or more processors in the application provider server, the quality and sufficiency of a connection of the user's smartphone to the application provider's server system;
    2) displays on the user's smart phone video game options and contests for playing video games over the network through the application provider's server system, wherein the video game options are based on an account status of the user, network quality and sufficiency, and game availability;
    3) places the user in a lobby as a video game player through the application provider's server system, wherein the video game player selects a video game and contest and plays the video game on one or more video game playing devices over the network and through the application provider's server system;
    4) monitors and records over the network video game scoring and progress of the video game player during video game playing, through the processor in the application provider's server system;
    5) verifies an identity of the video game player through the application provider's server system and invalidates the video game player's game playing if the video game player's identity is not verified; and
    6) ends the video game and distributes winnings to winners of the video game.

16. The system of claim 15, wherein the application provider's server obtains a video game baseline score or baseline progress measurement for each user for one or more games in one or more video game genres to match all users evenly in a video game and match.

17. The system of claim 15, wherein the application provider's server returns a video game player eliminated from a video game into the lobby and enters the video game player into another video game.

18. The system of claim 15, wherein the application provider's server detects cheating by a video game player in a video game by comparing baseline scores or baseline progress measurements of the video game player with scoring or progress of the video game player in the video game.

19. The system of claim 15, wherein the application provider's server places icons on a display of the user's smartphone to access an account function, a social media network function, a lobby function, a recent matches function, and a live matches function.

20. The system of claim 15, wherein the application provider's server enters an eliminated video game player into a video game in a video game set in a plurality of video game sets, wherein each video game set in the plurality of video game sets has a payout different from the other video game sets.

21. The system of claim 20, wherein the application provider's server returns the eliminated video game player into the lobby and entering the video game player into another video game in a different video game set, the different game set having a higher payout than the video game set from which the video game player was eliminated.

22. The system of claim 15, wherein the user pairs the user's smartphone with one or more video game playing devices and uses the user's smartphone for audio and visual communication during video game playing.

23. A system for league, tournament, and competition video game playing, comprising:
  a) an application provider's server system that includes one or more processors, a memory, and a league, tournament, and competition video game playing application (application) in the memory; and
  b) said one or more processors programmed to receive a request from a user's smartphone to download over a network to the user's smart phone said application into a memory of the user's smart phone, said memory of the user's smartphone including instructions that when executed cause one or more processors in the user's smart phone to initiate the application on the user's smartphone and connect the user to the application provider's server over the network, whereby the application provider's server, through the application:
    1) evaluates, by the one or more processors in the application provider server, the quality and sufficiency of a connection of the user's smartphone to the application provider's server system;
    2) displays on the user's smart phone video game options and contests for playing video games over the network through the application provider's server system, wherein the video game options are based on an account status of the user, network quality and sufficiency, and game availability;
    3) obtains a video game baseline score or baseline progress measurement for each user for one or more games in one or more video game genres to match all users evenly in a video game and match;
    4) places the user in a lobby as a video game player through the application provider's server system, selects a video game and contest and the video game player plays the video game on one or more video game playing devices over the network and through the application provider's server system;
    5) monitors and records over the network video game scoring and progress of the video game player during video game playing, by the processor in the application provider's server system;
    6) verifies an identity of the video game player through the application provider's server system and invalidates the video game player's game playing if the user's identity is not verified;
    7) detects cheating by a video game player in a video game by comparing baseline scores or baseline progress measurements of the video game player with scoring or progress of the video game player in the video game;
    8) ends the video game and distributes winnings to winners of the video game; and
    9) uses icons by the user on a display of the user's smartphone to access an account function, a social media network function, a lobby function, a recent matches function, and a live matches function, through the network and the application provider's server system.

24. The system of claim 23, wherein the application provider's server returns a video game player eliminated from a video game into the lobby and enters the eliminated video game player into another video game.

25. The system of claim 23, wherein the application provider's server enters the video game player into a video game in a video game set in a plurality of video game sets, wherein each video game set in the plurality of video game sets has a payout different from the other video game sets.

26. The system of claim 25, wherein the application provider's server returns the eliminated video game player into the lobby and enters the eliminated video game player into another video game in a different video game set, the different game set having a higher payout than the video game set from which the video game player was eliminated.

27. The system of claim 23, wherein and the user pairs the user's smartphone with one or more video game playing devices and uses the user's smartphone for audio and visual communication during video game playing.

28. A system for league, tournament, and competition video game playing, comprising:
  a) an application provider's server system that includes one or more processors, a memory, and a league, tournament, and competition video game playing application (application) in the memory; and
  b) said one or more processors programmed to receive a request from a user's smartphone to download over a network to the user's smart phone said application into a memory of the user's smart phone, said memory of the user's smartphone including instructions that when executed cause one or more processors in the user's smart phone to initiate the application on the user's smartphone and connects the user to the application provider's server over the network, whereby the application provider's server, through the application:
    1) evaluates, by the one or more processors in the application provider server, the the quality and sufficiency of a connection of the user's smartphone to the application provider's server system;
    2) displays on the user's smart phone video game options and contests for playing video games over the network through the application provider's server system, wherein the video game options are based on an account status of the user, network quality and sufficiency, and game availability, and the user pairs the user's smartphone with one or more video game playing devices and uses the smartphone for audio and visual communication during video game playing;
    3) obtains a video game baseline score or baseline progress measurement for each user for one or more games in one or more video game genres to match all users evenly in a video game and match;
4) places the user in a lobby as a video game player through the application provider's server system, selects a video game and contest and enters the video game player into a video game in a video game set in a plurality of video game sets, wherein each video game set in the plurality of video game sets has a payout different from the other video game sets and the user plays the video game on one or more video game playing devices over the network and through the application provider's server system;
5) monitors and records over the network video game scoring and progress of the video game player during video game playing, by the processor in the application provider's server system;
6) verifies an identity of the video game player through the application provider's server system and invalidates the video game player's game playing if the user's identity is not verified;
7) detects cheating by a video game player in a video game by comparing baseline scores or baseline progress measurements of the video game player with scoring or progress of the video game player in the video game;
8) ends the video game and distributing winnings to winners of the video game; and
9) uses icons by the user on a display of the user's smartphone to access an account function, a social media network function, a lobby function, a recent matches function, and a live matches function, through the network and the application provider's server system.

\* \* \* \* \*